United States Patent
Suh et al.

(10) Patent No.: US 10,516,838 B2
(45) Date of Patent: Dec. 24, 2019

(54) EVENT-BASED SENSOR AND EVENT-BASED SENSING METHOD

(71) Applicant: SAMSUNG ELECTRONICS CO., LTD., Suwon-si (KR)

(72) Inventors: Yun Jae Suh, Suwon-si (KR); Sung Ho Kim, Yongin-si (KR); Jun Seok Kim, Hwaseong-si (KR); Hyun Surk Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 15/627,555

(22) Filed: Jun. 20, 2017

(65) Prior Publication Data

US 2018/0167570 A1    Jun. 14, 2018

(30) Foreign Application Priority Data

Dec. 14, 2016 (KR) .................. 10-2016-0170683

(51) Int. Cl.
  *H04N 5/361* (2011.01)
  *H04N 5/341* (2011.01)
  *H04N 5/3745* (2011.01)

(52) U.S. Cl.
  CPC .................. *H04N 5/361* (2013.01)

(58) Field of Classification Search
  CPC ...... H04N 5/361; H04N 5/3698; H04N 5/341; H04N 5/3745
  See application file for complete search history.

(56) References Cited

U.S. PATENT DOCUMENTS

| | | | |
|---|---|---|---|
| 9,748,303 B2* | 8/2017 | Inoue | H01L 27/14643 |
| 2008/0135731 A1* | 6/2008 | Lichtsteiner | H04N 5/374 |
| | | | 250/208.1 |
| 2008/0225140 A1* | 9/2008 | Raynor | H04N 5/361 |
| | | | 348/243 |
| 2009/0294631 A1* | 12/2009 | Parks | H04N 5/365 |
| | | | 250/208.1 |
| 2013/0105664 A1* | 5/2013 | Barbier | H01L 27/14609 |
| | | | 250/208.1 |
| 2016/0134822 A1* | 5/2016 | Kosonen | H04N 5/374 |
| | | | 348/308 |
| 2016/0323524 A1* | 11/2016 | Smith | H04N 5/23245 |
| 2017/0213077 A1* | 7/2017 | Park | G06F 3/017 |

* cited by examiner

*Primary Examiner* — Amy R Hsu
(74) *Attorney, Agent, or Firm* — Sughrue Mion, PLLC

(57) ABSTRACT

An event-based sensor includes: a pixel array configured to output activation signals in response to an input to the pixel array; and a controller configured to output a control signal for supplying a first photocurrent generated in a first pixel of the pixel array to a second pixel of the pixel array.

19 Claims, 9 Drawing Sheets

EVENT-BASED SENSOR AND EVENT-BASED SENSING METHOD

CROSS-REFERENCE TO THE RELATED APPLICATION

This application claims priority from Korean Patent Application No. 10-2016-0170683 filed on Dec. 14, 2016 in the Korean Intellectual Property Office, the disclosure of which is incorporated herein in its entirety by reference.

BACKGROUND

1. Field

Apparatuses and methods consistent with the example embodiments of the inventive concept relate to an event-based sensor and an event-based sensing method.

2. Description of Related Art

Human-computer interaction (HCI) is concerned with interfaces between users and computers. Various user interfaces for providing a means for a user input may provide natural interaction between humans and computers. Various sensors may also be used to recognize the user input. In order to provide natural interaction, a sensor in which response speed to the user input is relatively fast is required. In addition, in a case of various mobile devices, there is a need to consume less power while performing various smart functions through a user interface. Accordingly, a sensor, in which power consumption is low, while response speed is fast, and reliability for the purposes of sensing is high, is required.

SUMMARY

According to an example embodiment, there is provided an event-based sensor which may include: a pixel array configured to output activation signals in response to an input to the pixel array; and a controller configured to output a control signal for supplying a first photocurrent generated in a first pixel of the pixel array to a second pixel of the pixel array.

According to an example embodiment, there is provided an event-based sensor which may include: a plurality of pixels configured to generate respective photocurrents in response to input light; and a controller configured to select one or more pixels to generate and supply a photocurrent to a given pixel, among the plurality of pixels, based on a noise level of the given pixel, so that the given pixel generates an activation signal based on the photocurrent.

According to an example embodiment, there is provided a pixel in an event-based sensor. The pixel may include: a photodiode configured to generate a photocurrent based on incident light; a pixel circuit configured to output an activation signal based on the photocurrent; and a switching circuit configured to control connection between the photodiode and the pixel circuit depending on a control signal.

BRIEF DESCRIPTION OF DRAWINGS

The above and other aspects, features and other advantages of the present inventive concept will be more clearly understood from the following detailed description, taken in conjunction with the accompanying drawings, in which.

DETAILED DESCRIPTION OF THE EXAMPLE EMBODIMENTS

Figure 1:
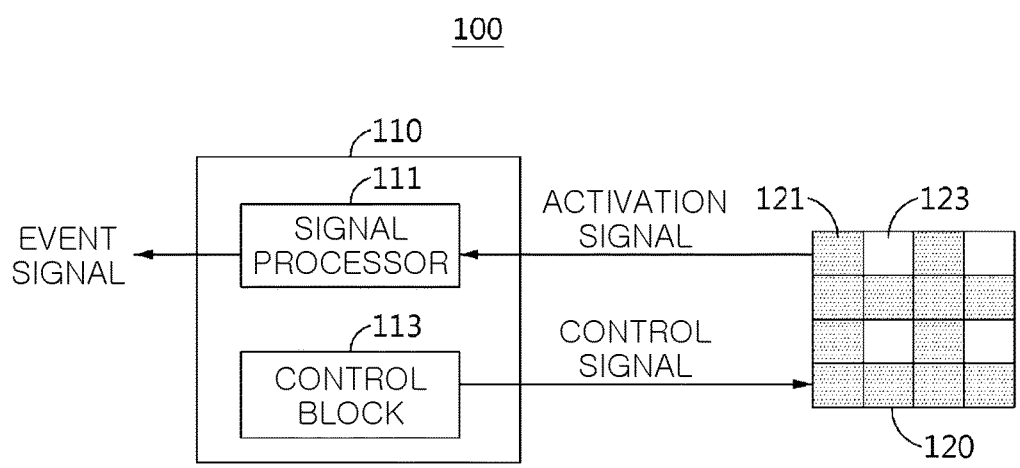
FIG. 1 is a view illustrating an event-based sensor according to an example embodiment.

FIG. 1 is a view illustrating an event-based sensor according to an example embodiment. With reference to FIG. 1, an event-based sensor 100 may include a controller 110 and a pixel array 120.

The pixel array 120 may include a plurality of pixels including a first pixel 121, a second pixel 123, etc. The plurality of pixels included in the pixel array 120 may output activation signals in response to an input, such as a dynamic input, thereto. The dynamic input may include a change in intensity of light incident on the pixel array 120. The dynamic input may be generated by at least one of movement of an object, movement of the pixel array 120, a change in light projected onto an object, and a change in light emitted by an object. For example, the pixel array 120 may detect a dynamic input by a user's hand gesture, and output an activation signal indicating a corresponding dynamic input. In this case, the activation signal may be used for recognizing a user's gesture. The activation signal may be generated by a different type of input other than the dynamic input.

The controller 110 may include a signal processor 111 and a control block 113. In FIG. 1, the signal processor 111 and the control block 113 are illustrated as being separated from each other, but the signal processor 111 and the control block 113 may be implemented as a single configuration such as a semiconductor chip. The signal processor 111 may receive an activation signal from the pixel array 120, and output an event signal in response to or based on the activation signal. The event signal may include location information of a pixel outputting an activation signal and time information when an activation signal is output. For example, the location information may include an address of a pixel outputting an activation signal, and time information may include a time stamp of a time at which an activation signal is output. The activation signal may be output by a pixel, among the plurality of pixels included in the pixel array 120, detecting a change in light above a certain level. Thus, the event-based sensor 100 may asynchronously generate and output an event signal, and may be operated with low power and at high speed, as compared to a frame-based vision sensor scanning every pixel in each frame.

The control block 113 may output a control signal to the pixel array 120 through a control line. The pixel array 120 may include an internal switching circuit located inside a pixel and an external switching circuit located between pixels. The internal switching circuit and the external switching circuit may change a connection state of a signal line for transferring a photocurrent generated in one or more pixels to another pixel. Hereinafter, an operation of transferring the photocurrent generated in one or more pixels to another pixel may be referred to as binning. For example, a first photocurrent generated in the first pixel 121 may be supplied to the second pixel 123 through a signal line based on a control signal. In this case, the second pixel 123 may output an activation signal based on the first photocurrent and a second photocurrent generated in the second pixel 123.

As will be explained in detail below, each pixel included in the pixel array 120 may include a photodiode for generating a photocurrent based on incident light, and a pixel circuit for outputting an activation signal based on the photocurrent which is generated by the photodiode. In the pixel circuit, noise, in inverse proportion to an amount of an input current applied to the pixel circuit, may occur, and a false event may occur due to the noise.

According to example embodiments, as described above, the first photocurrent generated in the first pixel 121 may be supplied to the second pixel 123, and the second pixel 123 may output an activation signal based on the first photocurrent and the second photocurrent generated in the second pixel 123. A pixel for supplying a photocurrent to the second pixel 123 may be one or more other pixels, in addition to the first pixel 121. The number of pixels for supplying respective photocurrents to the second pixel 123 may be determined to a level in which noise generated in a pixel circuit of the second pixel 123 may be sufficiently reduced. Thus, according to example embodiments, the occurrence of a false event may be suppressed.

A pixel of the pixel array 120 converts a photocurrent into a voltage, compares information about the voltage with a predetermined threshold, and outputs an activation signal, based on a result of the comparison. Specifically, the pixel may amplify an amount of change in the voltage, and compare the amount of change in the voltage with the predetermined threshold to output the activation signal. As the second pixel 123 may receive the first photocurrent from the first pixel 121, a process appropriate for outputting an activation signal may be performed.

According to an example embodiment, when the second pixel 123 receives the first photocurrent from the first pixel 121, a threshold for outputting an activation signal of the second pixel 123 may be adjusted. For example, as the first photocurrent is supplied to the second pixel 123, a predetermined threshold used by the second pixel 123 may be increased at an appropriate rate. In this case, the second pixel 123 may output an activation signal based on a voltage corresponding to a sum of the first photocurrent and the second photocurrent occurring in the second pixel 123, and a threshold adjusted according to supply of the first photocurrent. According to an example embodiment, when the second pixel 123 receives the first photocurrent from the first pixel 121, a statistical technique may be applied to a voltage to which a photocurrent totaled in the second pixel 123 is converted. For example, the second pixel 123 may output an activation signal based on a voltage corresponding to an average of a first photocurrent and a second photocurrent, and a predetermined threshold.

According to an example embodiment, the control block 113 may output a control signal based on an operation mode of the event-based sensor 100, illuminance around the event-based sensor 100, or a combination thereof. For example, the event-based sensor 100 may obtain information regarding illuminance around the event-based sensor 100, and may output a control signal for binning through the control block 113, when illuminance around the event-based sensor 100 is lower than a predetermined threshold. Alternatively, the control block 113 may output a control signal as the event-based sensor 100 is operated in a subsampling mode. In the subsampling mode, at least a portion of the plurality of pixels included in the pixel array 120 may be inactive. In this case, the control block 113 may output a control signal to supply a photocurrent occurring in a photodiode inside a pixel in an inactive state to a pixel in an active state.

Figure 2:
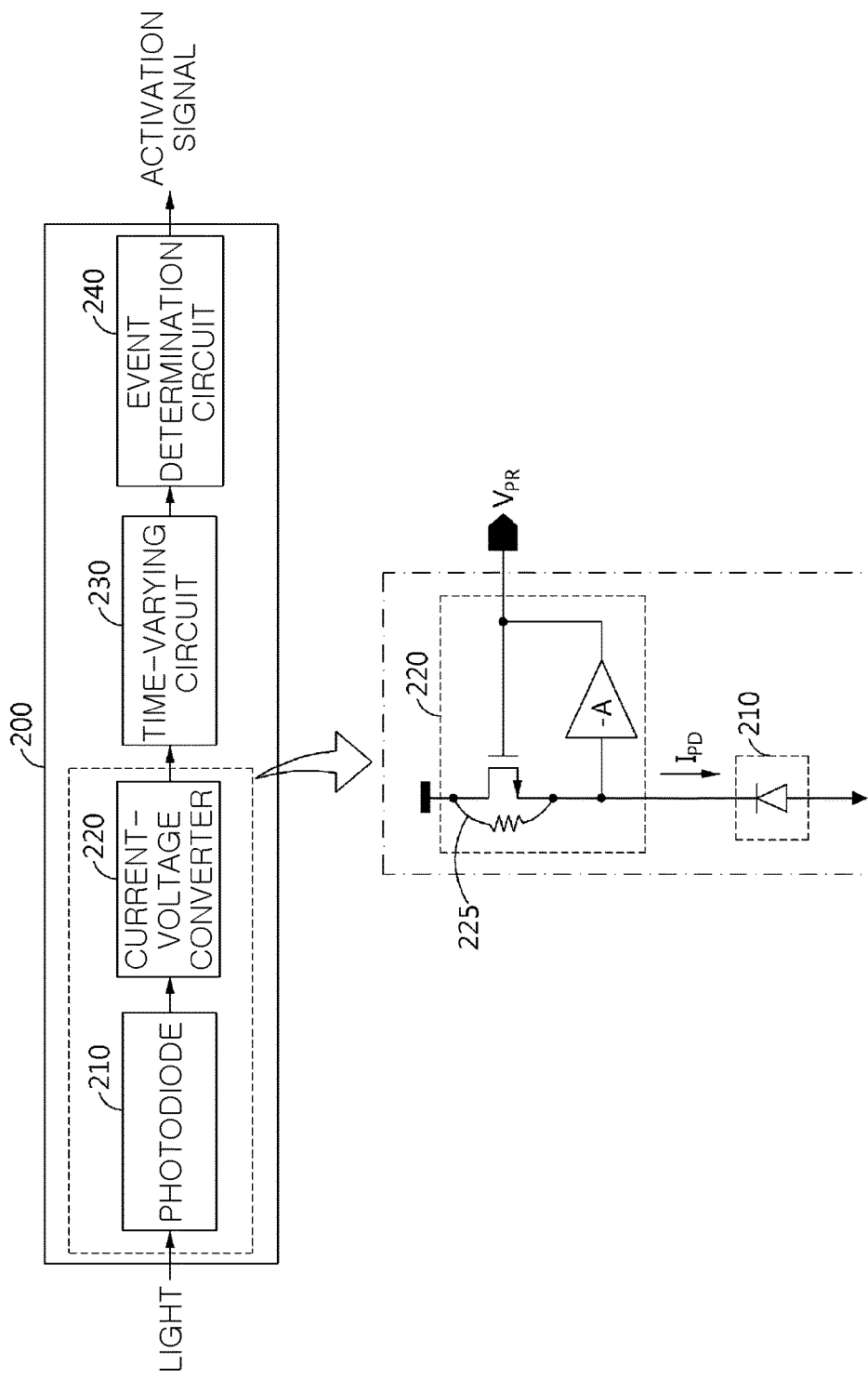
FIG. 2 is a view illustrating a pixel in an event-based sensor according to an example embodiment.

FIG. 2 is a view illustrating a pixel in an event-based sensor according to an example embodiment. With reference to FIG. 2, a pixel 200 may include a photodiode 210, a current-voltage converter 220, a time-varying circuit 230, and an event determination circuit 240. Hereinafter, a circuit including the current-voltage converter 220, the time-varying circuit 230, and the event determination circuit 240 may be referred to as a pixel circuit.

The photodiode 210 may generate a photocurrent $I_{PD}$ based on light incident on the photodiode 210, and the pixel circuit may output an activation signal based on the photocurrent $I_{PD}$. In detail, the current-voltage converter 220 may convert the photocurrent $I_{PD}$ into a voltage. For example, the current-voltage converter 220 may include a transistor and an amplifier. As the photocurrent $I_{PD}$ is input to the current-voltage converter 220, a current flows through the transistor and a voltage $V_{PR}$ may be generated. In this case, an amount of the current flowing through the transistor may not be linearly proportional to detected light intensity. The amplifier may amplify the photocurrent $I_{PD}$ on a logarithmic scale so that a magnitude of the voltage $V_{PR}$ is linearly proportional to light intensity detected by the photodiode 210.

In the current-voltage converter 220, noise in inverse proportion to an input current due to influence of a channel resistance 225 may occur. The noise may generate a false event. The false event may be a case in which an activation signal is output, even when a sufficient amount of a change in light is not detected. As illuminance around an event-based sensor is low, a magnitude of the photocurrent $I_{PD}$ which is an input current is reduced. Thus, as illuminance around an event-based sensor is lowered, noise may be increased, and a frequency of the false event occurrence may be increased. According to an example embodiment, not only the photocurrent $I_{PD}$, but also a photocurrent generated in a photodiode of another pixel may be supplied to the current-voltage converter 220. Thus, noise generated in the current-voltage converter 220 may be reduced, and a false event may be suppressed.

The time-varying circuit 230 may amplify an amount of change in the voltage which has been converted by the current-voltage converter 220, at a predetermined rate. For example, the time-varying circuit 230 may include at least one of a capacitor and an amplifier. At least one capacitor may charge a charge as the voltage $V_{PR}$ is changed, and the amplifier may amplify a voltage generated due to the charge charged in the at least one capacitor at a predetermined rate. The event determination circuit 240 may compare the amplified amount of change in the voltage with a predetermined threshold, and may output an activation signal based on a comparison result. For example, the event determination circuit 240 may include a comparator for comparing the amplified amount of change in the voltage with the predetermined threshold. The comparator may compare the amplified amount of change in the voltage with a reference signal corresponding to the predetermined threshold, and output an activation signal if the amplified amount of change in the voltage is greater than the reference signal.

Figure 3:
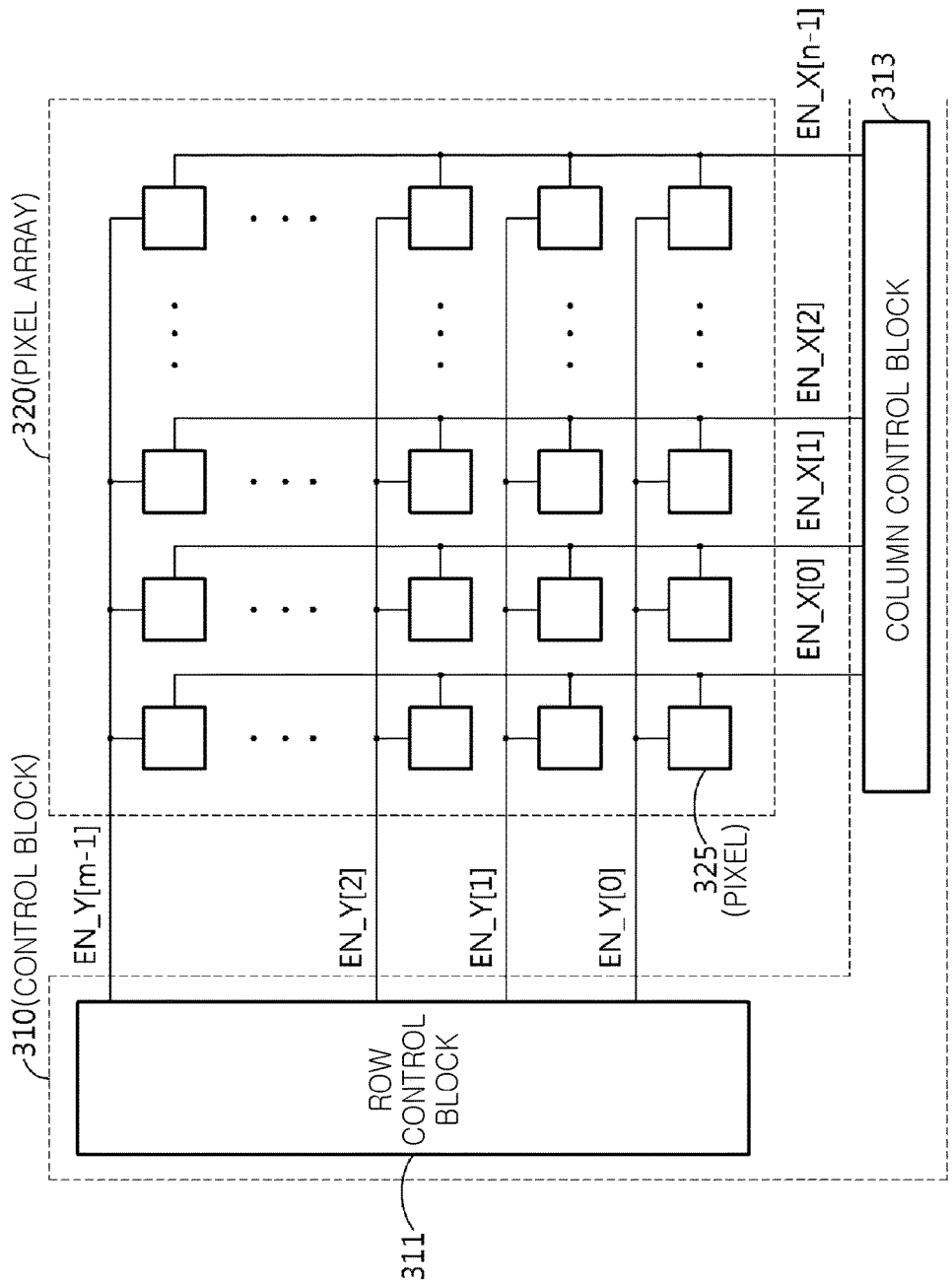
FIG. 3 is a view illustrating a control block and a pixel array according to an example embodiment.

FIG. 3 is a view illustrating a control block and a pixel array, according to an example embodiment. With reference to FIG. 3, a control block 310 may include a row control block 311 and a column control block 313. The plurality of pixels included in a pixel array 320 may be arranged in matrix form. The row control block 311 and plurality of pixels included in the pixel array 320 may be connected to a first control line, and the column control block 313 and the plurality of pixels included in the pixel array 320 may be connected to a second control line. Thus, the row control block 311 may select pixels in a row direction of the matrix through a first control signal EN_Y, and the column control block 313 may select pixels in a column direction of the matrix through a second control signal EN_X. For example, a pixel 325 may be selected through EN_Y[0] and EN_X[0].

As explained in detail below, if the pixel 325 is selected, in order to supply a photocurrent generated in a photo diode to a pixel circuit in the pixel 325, the photodiode and the pixel circuit of the pixel 325 may be connected to each other. In addition, if the pixel 325 is not selected, in order to supply a photocurrent generated in the pixel 325 to another pixel, a connection between the photodiode and the pixel circuit of the pixel 325 may be blocked. Through a control operation, the control block 310 may supply a photocurrent generated in a specific pixel to another pixel (for example, a pixel selected by control signals).

Figure 4:
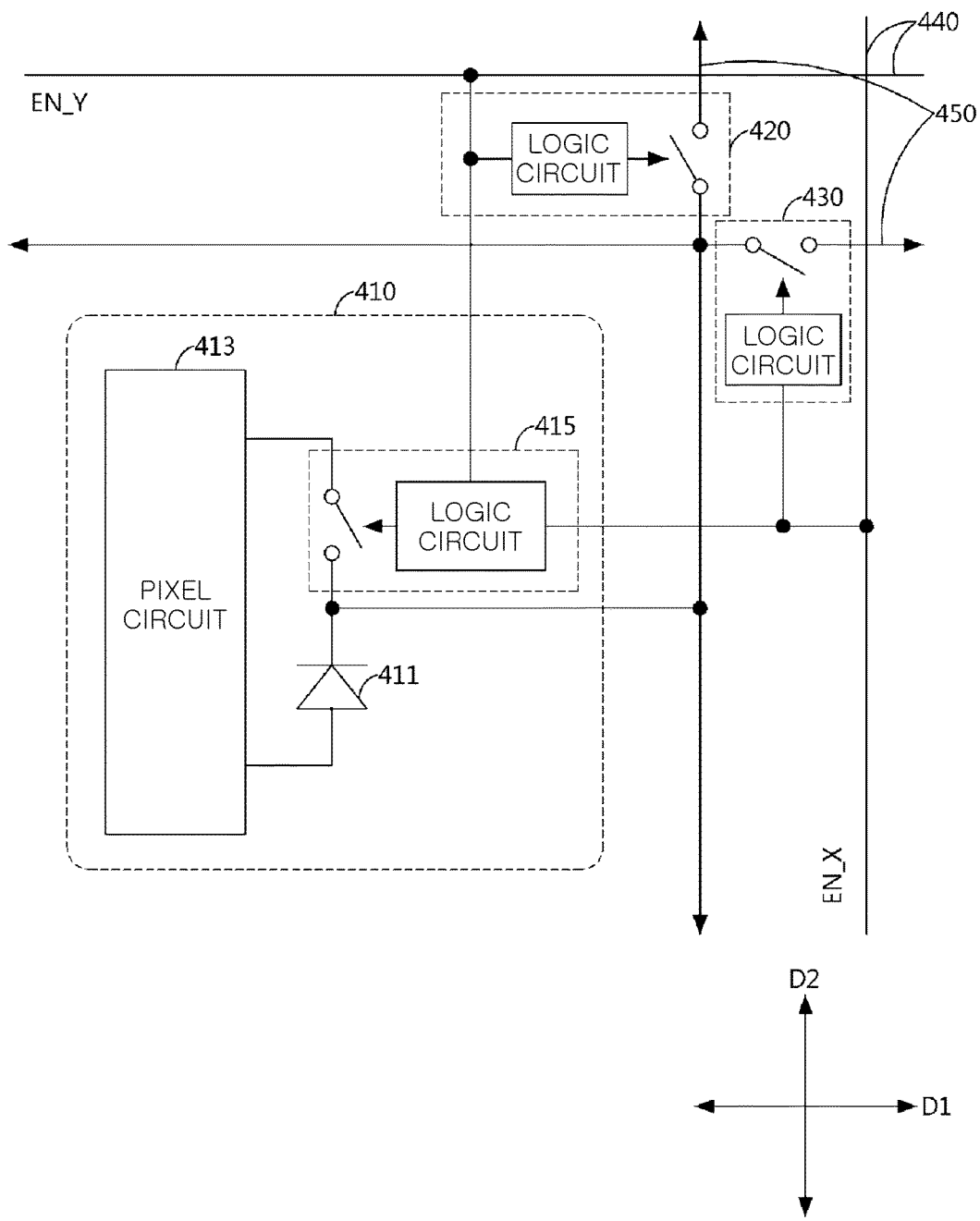
FIG. 4 is a view illustrating a structure of a single pixel according to an example embodiment.
Figure 5:
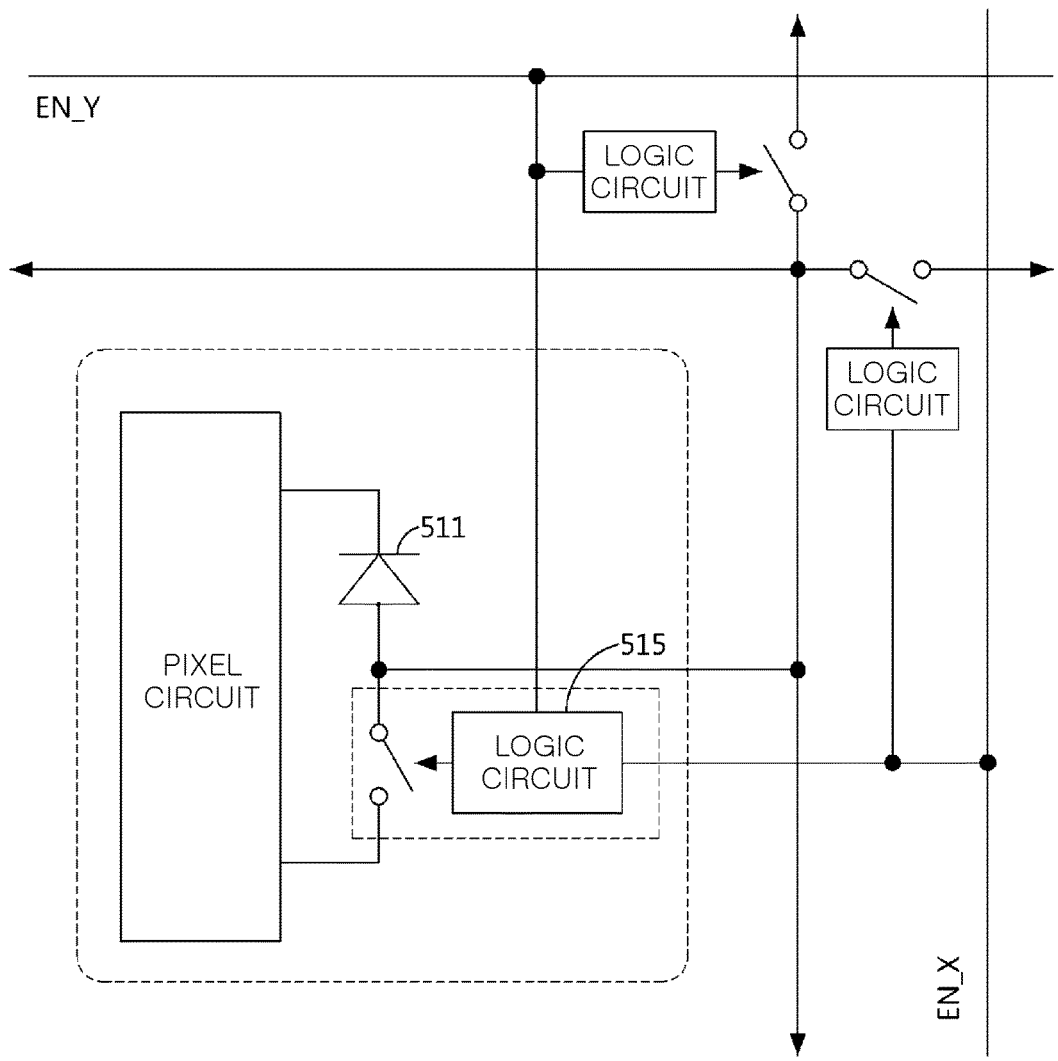
FIG. 5 is a view illustrating a structure of a single pixel according to a different example embodiment.

FIG. 4 is a view illustrating a structure of a single pixel according to an example embodiment. With reference to FIG. 4, a pixel 410 may include a photodiode 411, a pixel circuit 413, and a switching circuit 415. The switching circuit 415 may control a connection between the photodiode 411 and the pixel circuit 413 depending on a control signal. Controlling a connection between two configurations may include opening or closing a connection between two configurations. For example, the switching circuit 415 may open or close a connection between the photodiode 411 and the pixel circuit 413 depending on a control signal. According to an example embodiment, the switching circuit 415 may be located at a lower end of the photodiode 411. FIG. 5 is a view illustrating a structure of a single pixel according to a different example embodiment. With reference to FIG. 5, a switching circuit 515 may control a connection between a photodiode 511 and a pixel circuit 513 at a lower end of the photodiode 511.

Referring again to FIG. 4, switching circuits 420 and 430, a control line 440, and a signal line 450 are illustrated on the periphery of the pixel 410. The switching circuits 420 and 430 may control connections between the photodiode 411 and pixel circuits of other pixels. The switching circuit 420 may transfer a photocurrent generated in the photodiode 511 in the column direction D2 of a matrix, and the switching circuit 430 may transfer the photocurrent generated in the photodiode 511 in the row direction D1 of a matrix.

Hereinafter, a switching circuit located inside a pixel may be referred to as an internal switching circuit, and a switch circuit located between a pixel and a pixel may be referred to as an external switching circuit. For example, the switching circuit 415 may be referred to as an internal switching circuit, and the switching circuit 420 and the switching circuit 430 may be referred to as an external switching circuit. In this case, the internal switching circuit and the external switching circuit may be exclusively operated based on a control signal. For example, when the internal switching circuit is closed depending on a control signal, the external switching circuit may be open depending on the same control signal. In addition, when the internal switching circuit is open depending on a control signal, the external switching circuit may be closed depending on the same control signal. Each of the switching circuits 415, 420, and 430 may include at least one of at least one transistor and at least one logic element. According to an example embodiment, a switch illustrated in FIGS. 4 and 5 may be replaced with a transistor.

The control line 440 may transfer a control signal to the switching circuits 415, 420, and 430. The control line 440 may include a first control line for selecting a pixel in the row direction D1 of a matrix, and a second control line for selecting a pixel in the column direction D2 of the matrix. In addition, the signal line 450 may transfer a photocurrent generated in one pixel to another pixel. The signal line 450 may include a first signal line for transferring a photocurrent in the row direction D1 of a matrix, and a second signal line for transferring the photocurrent in the column direction D2 of the matrix. As a control block controls switching circuits through the control line 440, a photocurrent of one pixel may be supplied to another pixel through the signal line 450.

In FIGS. 4 and 5, the pixels 410 and 510 are illustrated as including the switching circuits 415 and 515, respectively, but a structure of a pixel is not necessarily limited thereto.

For example, while a pixel does not include a separate switching circuit, as illustrated with reference to FIG. 1, when the pixel is inactive in a subsampling mode, the pixel may supply an optical signal of a corresponding pixel to another pixel through a signal line.

Figure 6:
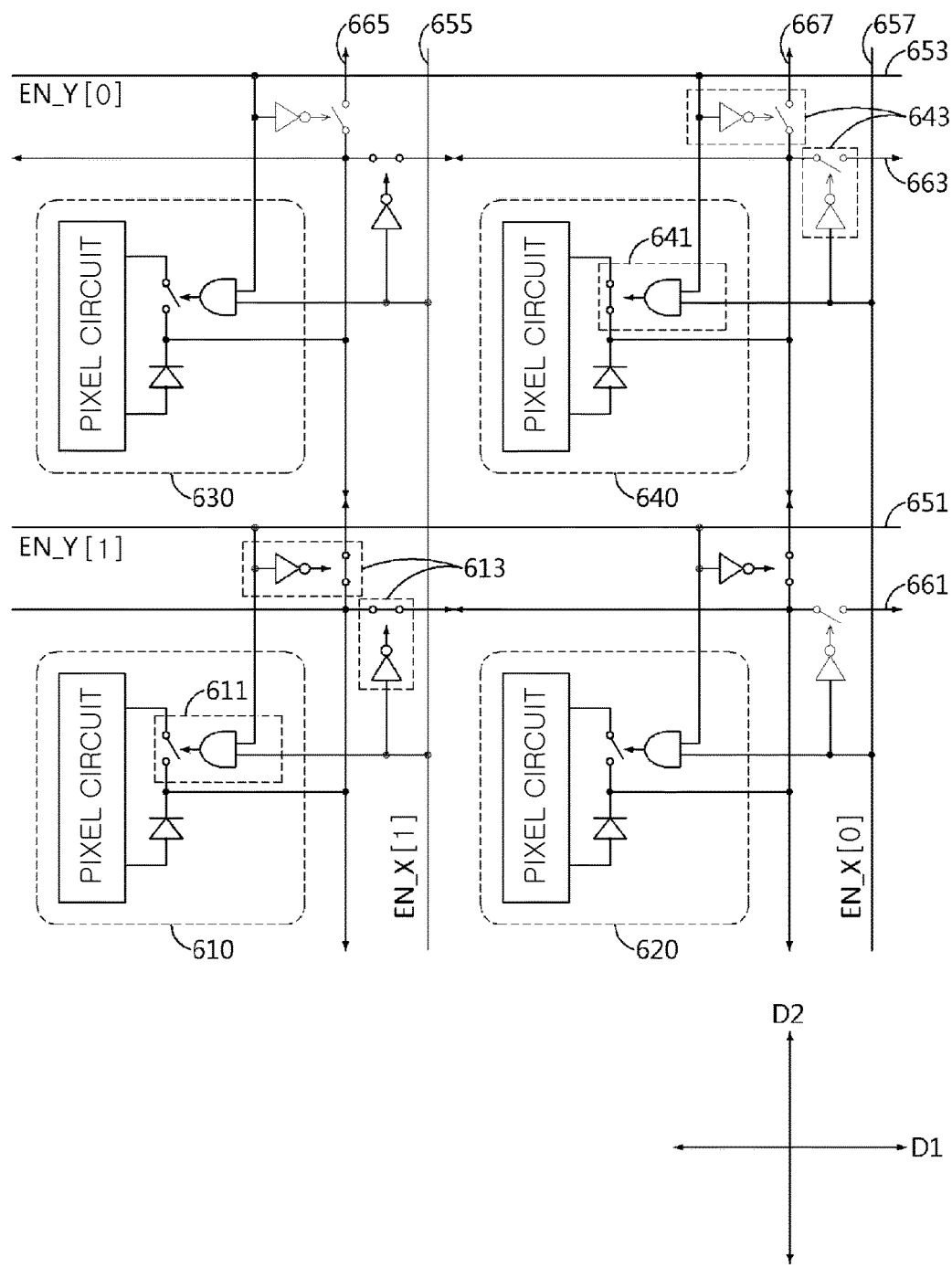
FIG. 6 is a view illustrating a structure of a plurality of pixels according to an example embodiment.

FIG. 6 is a view illustrating a structure of a plurality of pixels according to an example embodiment. With reference to FIG. 6, internal switching circuits may include an AND gate and a switch, and external switching circuits may include a NOT gate and a switch. A configuration of the internal switching circuits and the external switching circuits illustrated in FIG. 6 only corresponds to one example embodiment, and the internal switching circuits and the external switching circuits may be implemented in another configuration. For example, each of internal switching circuits may be implemented as two transistors, connected in series and performing the same function as the combination of an AND gate and a switch. In addition, each of external switching circuits may be implemented as a single transistor and performing the same function as the combination of a NOT gate and a switch.

According to an example embodiment of FIG. 6, a control signal EN_X[0] and a control signal EN_Y[0] are '1', and a control signal EN_X[1] and a control signal EN_Y[1] is '0'. Here, '1' may be a digital high level, or may be a signal indicating true, and '0' may be a digital low level, or may be a signal indicating false.

According to a control signal, an internal switching circuit 611 of a pixel 610 may be open, and external switching circuits 613 of the pixel 610 may be closed. Similarly, depending on a control signal, internal switching circuits of pixels 620 and 630 may be open, and a portion of external switching circuits of the pixels 620 and 630 may be closed. In addition, depending on a control signal, an internal switching circuit 641 of a pixel 640 may be closed, and external switching circuits 643 of the pixel 640 may be open. Thus, a photocurrent generated in a photodiode of the pixel 640 and photocurrents generated in the pixels 610, 620, and 630 may be supplied to a pixel circuit of the pixel 640. Thus, the pixel circuit of the pixel 640 may output an activation signal based on the photocurrents generated in the pixels 610, 620, 630, and 640.

As described above, the pixel 640 may perform an additional process for outputting an activation signal, as the photocurrents are supplied from the pixels 610, 620, and 630. According to an example embodiment, the pixel 640 may total the photocurrents supplied from the pixels 610, 620, and 630 and the photocurrent generated in the pixel 640. The pixel 640 may convert these totaled photocurrents into a voltage, and an amount of change in the converted voltage may be amplified at a predetermined rate. In this case, for comparison with the amplified amount of change in the voltage, a predetermined threshold may be adjusted. The predetermined threshold may be adjusted at a predetermined rate, and the predetermined rate may be determined based on the number of binned pixels. For example, the predetermined rate with respect to the pixel 640 may be 1/4. The pixel 640 may compare the amplified amount of change in the voltage to an adjusted threshold as the photocurrents are supplied from the pixels 610, 620, and 630, and output an activation signal based on a comparison result.

According to an example embodiment, the pixel 640 may total the photocurrents supplied from the pixels 610, 620, and 630 and the photocurrent generated in the pixel 640, and convert the totaled photocurrents into a voltage, or convert an average of the photocurrents supplied from the pixels 610, 620, and 630 and the photocurrent generated in the pixel 640 into a voltage. In addition, the pixel 640 may amplify an amount of change in the converted voltage at a predetermined rate, and compare the amplified amount of change in the voltage with a predetermined threshold. The pixel 640 may output an activation signal based on a comparison result.

With reference to FIG. 6, a control line for transferring a control signal to an internal switching circuit of pixels 610, 620, 630, and 640 and an external switching circuit between the pixels 610, 620, 630, and 640, and a signal line for transferring photocurrents generated in the pixels 610, 620, and 630 to the pixel 640 are illustrated therein. The control line may include first control lines 651 and 653 for selecting a pixel in the row direction D1, and second control lines 655 and 657 for selecting a pixel in the column direction D2. In addition, the signal line may include first signal lines 661 and 663 for transferring photocurrent in the row direction D1 of a matrix, and second signal lines 665 and 667 for transferring the photocurrent in the column direction D2 of the matrix.

Pixels and a control line may be selected by a control signal '1'. For example, due to a control signal EN_X[0] and a control signal EN_Y[0], the pixel 640, the first control line 653, and the second control line 657 may be selected. When the first control line 653 is selected, the second signal lines 665 and 667 may be blocked. When the second control line 657 is selected, the first signal lines 661 and 663 may be blocked. In addition, according to selection of both of the first control line 653 and the second control line 657, a photodiode of the pixel 640 and a pixel circuit of the pixel 640 may be connected to each other. In addition, when the first control line 651 is not selected, the second signal lines 665 and 667 may be connected. When the second control line 655 is not selected, the first signal lines 661 and 663 may be connected. In addition, when both the first control line 651 and the second control line 655 are not selected, connection between a photodiode of the pixel 610 and a pixel circuit of the pixel 610 may be blocked. As described above, an internal switching circuit of a pixel and an external switching circuit on the periphery of the pixel may be exclusively operated based on a control signal.

Figure 7:
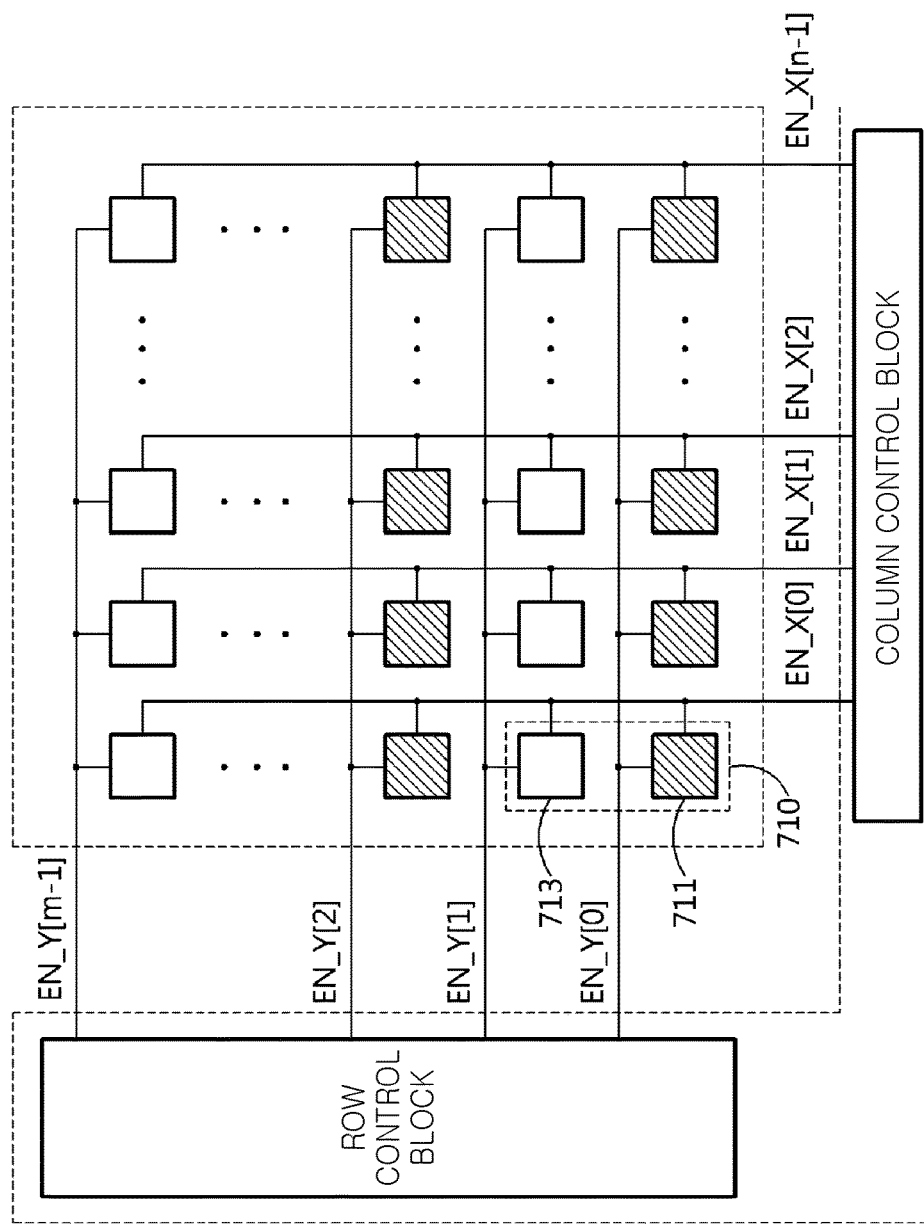
FIG. 7 is a view illustrating a binning area according to an example embodiment.
Figure 8:
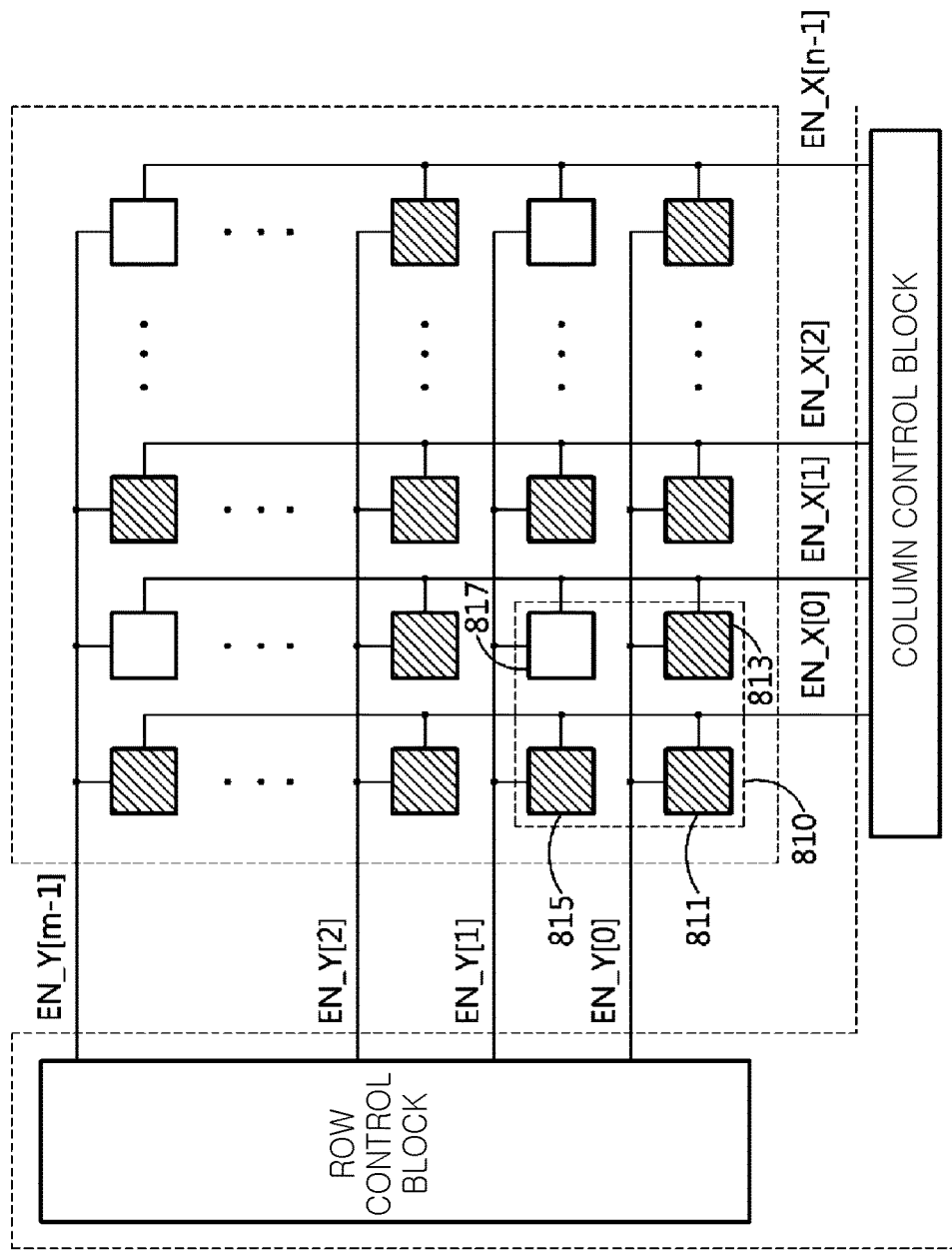
FIG. 8 is a view illustrating a binning area according to an example embodiment.

FIG. 7 is a view illustrating a binning area according to an example embodiment, and FIG. 8 is a view illustrating a binning area according to a different example embodiment. With reference to FIGS. 7 and 8, a 2×1 binning area 710 and a 2×2 binning area 810 may be illustrated.

In the binning area 710, a pixel 711 may supply a photocurrent generated in the pixel 711 to a pixel 713. In the binning area 810, pixels 811, 813, and 815 may supply photocurrents generated in the pixels 811, 813, and 815 to a pixel 817. Hereinafter, a pixel for supplying a photocurrent to another pixel may be referred to as a first pixel, and a pixel for receiving a photocurrent from another pixel may be referred to as a second pixel. According to an example embodiment, the first pixel may include a plurality of pixels. FIG. 8 illustrates an example in which three pixels are provided as the first pixel.

The number of the plurality of pixels included in the first pixel may be determined based on a predetermined threshold. As described above, noise may be generated in inverse proportion to an amount of an input current applied to pixels. Here, an amount of an input current for reducing corresponding noise below a certain level may be determined, and a threshold may be determined in advance based on a determined amount of an input current. For example, when the sum of photocurrents generated by the pixels 711 and 713 exceeds a predetermined threshold, a first pixel may be determined as a single pixel. In addition, when a photocurrent generated in the pixel 817 or a sum of photocurrents generated by any two or three pixels including the pixel 817 among the four pixels 811, 813, 815, and 817 do not exceed the predetermined threshold, but the sum of photocurrents generated by the four pixels 811, 813, 815, and 817 exceeds a predetermined threshold, a first pixel may be determined as the three pixels 811, 813, and 815.

Figure 9:
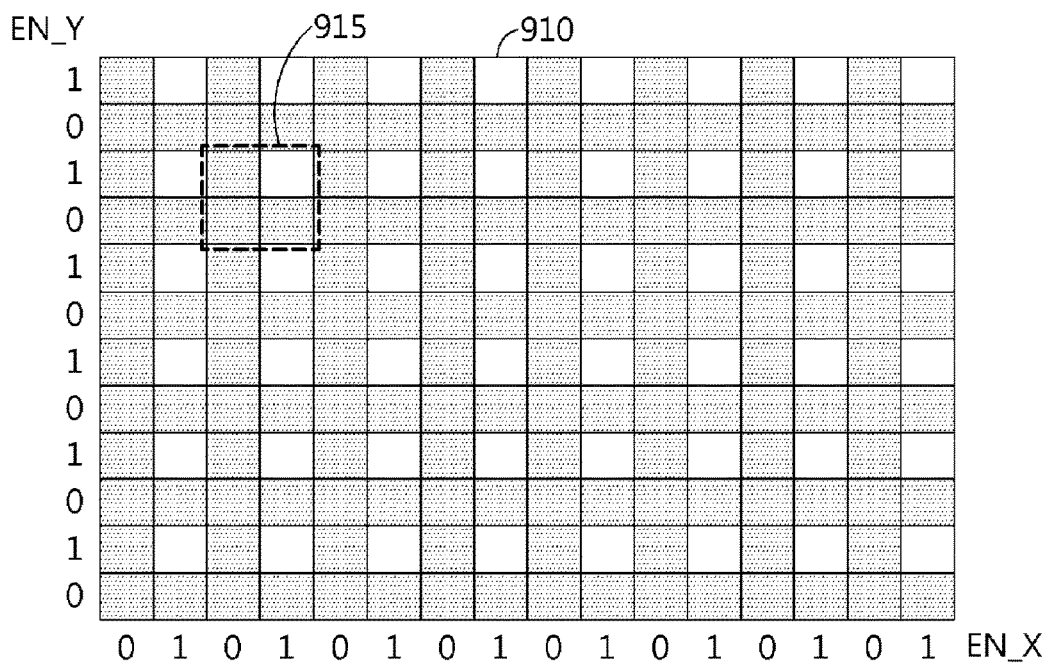
FIG. 9 is a view illustrating a pixel array in a subsampling mode according to an example embodiment.

FIG. 9 is a view illustrating a pixel array in a subsampling mode according to an example embodiment. With reference to FIG. 9, a pixel array 910, a region 915, and a control signal are illustrated.

An event-based sensor may be operated in different operation modes depending on the situation. For example, an operation mode of the event-based sensor may include a subsampling mode. The subsampling mode is a mode in which sensing is performed at a sensing resolution lower than a maximum sensing resolution of the event-based sensor. In a subsampling mode, at least a portion of the plurality of pixels included in the pixel array 910 may be inactive.

The event-based sensor may perform pixel binning in a subsampling mode. For example, the event-based sensor may select a second pixel thorough control signals (EN_X, EN_Y), and supply photocurrents generated in the first pixel to the second pixel. Thus, noise generated in the second pixel may be reduced. Referring to the region 915, some pixels may be activated depending on control signals (EN_X, EN_Y), '1', and a photocurrent generated in a pixel in an inactive state may be supplied to a pixel in an active state.

Figure 10:
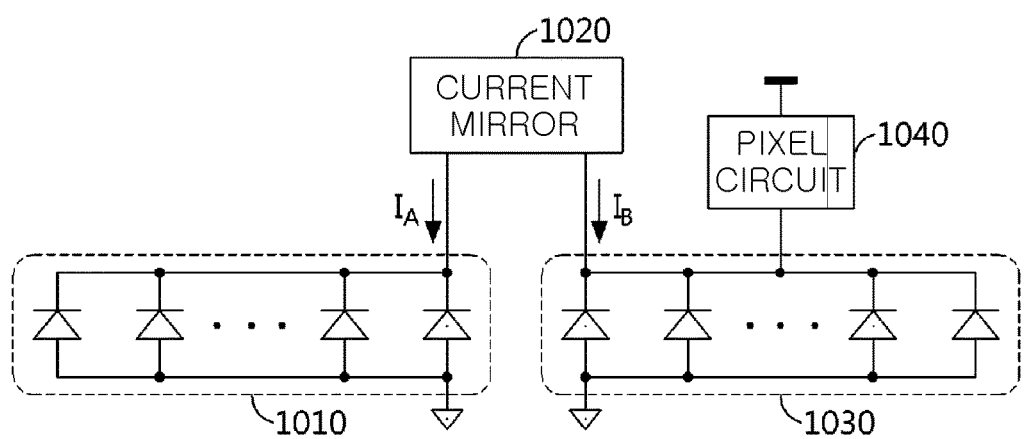
FIG. 10 is a view illustrating dummy pixels and binned pixels according to an example embodiment.

FIG. 10 is a view illustrating dummy pixels and binned pixels according to an example embodiment. Dark currents generated in dummy pixels 1010 and pixels 1030, binned by a current mirror 1020, may be removed.

As described above, a pixel included in a pixel array may include a photodiode. The photodiode may generate a photocurrent proportional to intensity of light incident on the photodiode, and the pixel may output an activation signal based on the photocurrent. The photocurrent may include a dark current generated in a light-free environment, and the dark current may act as noise, generating a false event.

When intensity of light incident on a photodiode is sufficient, or a temperature of the photodiode is not high, a proportion of a dark current in a photocurrent may be significantly small. In this case, the dark current may not have a significant effect on a sensing performance. However, in a low-light environment or when a temperature of a photodiode is high, a dark current may serve as a factor in lowering the sensing performance. In detail, as the proportion of a component corresponding to a dark current in a photocurrent increases, even when there is no change in light exceeding a threshold, an activation signal may be output.

According to an example embodiment, an event-based sensor may eliminate an effect of a dark current using the dummy pixels 1010. Light supplied to the dummy pixels 1010 may be blocked, and the dummy pixels 1010 may generate a current $I_A$ in a light-free environment. The event-based sensor may mirror the current $I_A$ using the current mirror 1020, and deduct a saturated component corresponding to the dark current from a current flowing in the binned pixels 1030 using the mirrored current $I_B$. In the case that a photodiode of the dummy pixels 1010 and a photodiode of the binned pixels 1030 generate currents under the same conditions, an effect of the dark current in the binned pixels 1030 may be eliminated. Here, the conditions may include a temperature, p-n junction, doping concentration, and the like.

When the conditions of the photodiode of the dummy pixel 1010 and the photodiode of the binned pixel 1030 are different, in order to allow a magnitude of a total dark current flowing in the binned pixel 1030 to be equal to a magnitude of the current $I_A$, the number of the dummy pixels 1010 and the number of the binned pixels 1030 may be adjusted. As described above, in the binned pixels 1030, noise generated in inverse proportion to an amount of an input current applied to the pixel circuit 1040 may be reduced to an appropriate level. Thus, according to an example embodiment, all noise generated in the pixel circuit 1040 and noise due to the dark current may be removed, and a sensing performance of an event-based sensor may be improved in a low-light environment and a high-temperature environment.

Example embodiments described above may be implemented as a hardware component, a software component, and/or a combination of a hardware component and a software component. For example, devices, methods, and components such as the controller 110, the signal processor 111, and the control block 113 in FIG. 1, as described in the example embodiments, may be implemented using one or more general purpose computers or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of executing and responding to a command. These devices or components may perform an operating system (OS) and one or more software applications performed running on the OS. In addition, these devices or components may access, store, manipulate, process, and generate data in response to the execution of the software. For convenience of understanding, when a single device or component is described as being used in some cases, those skilled in the art recognize that the device or component may include a plurality of processing elements and/or a plurality of types of processing elements. For example, the device or component may include a plurality of processors or a single processor and a single controller. In addition, other processing configurations, such as a parallel processor, are also possible.

Software may include a computer program, a code, a command, or one or more combinations thereof, and may form the device or component to be operated as desired or may independently or collectively command the device or component. The software and/or data may be permanently or temporarily embodied in any type of machine, component, physical device, virtual equipment, computer storage media or device, or a transmitted signal wave, in order to be interpreted by the device or component, or in order to provide a command or data to the device or component. The software may be distributed over a networked computer system to be stored or executed in a distributed manner. The software and data may be stored on one or more computer readable recording media.

A method according to an example embodiment may be implemented in a program command form which may be executed through various computer devices to be recorded on a computer-readable medium. The computer-readable medium may include a program command, a data file, a data structures, and the like, either alone or in combination thereof. The program command recorded on the medium may be specially designed and constructed for an example embodiment, or may be known and available to those skilled in the art of computer software. An example of a computer readable recording medium may include a magnetic media such as a hard disk, a floppy disk, and a magnetic tape, an optical media such as compact disc read-only memory (CD-ROM) and digital versatile disc (DVD), a magneto-optical media such as a floptical disk, and a hardware device specifically configured to store and execute a program command such as ROM, random access memory (RAM), a flash memory, and the like. An example of a program command may not only include a machine code generated by a compiler but also a high-level language code executed by a computer using an interpreter, and the like. The hardware device described above may be configured to be operated as one or more software modules in order to perform an operation according to an example embodiment, and vice versa.

While example embodiments have been shown and described above, it will be apparent to those skilled in the art that modifications and variations could be made without departing from the scope of the inventive concept, as defined by the appended claims.

What is claimed is:

1. An event-based sensor comprising:
   a pixel array configured to output activation signals in response to an input to the pixel array; and
   a controller configured to output a control signal for supplying a first photocurrent generated in a first pixel of the pixel array to a second pixel of the pixel array.

2. The event-based sensor of claim 1, wherein the second pixel is configured to output an activation signal based on the first photocurrent and a second photocurrent generated in the second pixel.

3. The event-based sensor of claim 2, wherein the first pixel comprises a plurality of pixels included in the pixel array, and
   wherein a number of the plurality of pixels is determined to allow a sum of the first photocurrent and the second photocurrent to be equal to or greater than a predetermined threshold.

4. The event-based sensor of claim 3, wherein the predetermined threshold is determined based on a magnitude of noise generated in inverse proportion to an amount of an input current, comprising the first photocurrent and the second photocurrent, applied to a pixel circuit configured to generate the activation signal in the second pixel.

5. The event-based sensor of claim 2, wherein the second pixel is configured to output the activation signal based on a voltage corresponding to a sum of the first photocurrent and the second photocurrent, and a threshold adjusted according to the supply of the first photocurrent to the second pixel.

6. The event-based sensor of claim 2, wherein the second pixel is configured to output the activation signal based on a voltage corresponding to an average of the first photocurrent and the second photocurrent, and a predetermined threshold.

7. The event-based sensor of claim 1, wherein the controller is configured to output the control signal to supply the first photocurrent generated in the first pixel which is in an inactive state to the second pixel which is in an active state, in a subsampling mode in which at least a portion of a plurality of pixels included in the pixel array is inactive.

8. The event-based sensor of claim 1, further comprising:
a signal line to transfer the first photocurrent to the second pixel; and
a control line to transfer the control signal to an internal switching circuit of the first pixel, and an external switching circuit between the first pixel and the second pixel.

9. The event-based sensor of claim 8, wherein the pixel array comprises a plurality of pixels, comprising the first pixel and the second pixel, which are arranged in a matrix form,
wherein the signal line comprises a first signal line for transferring the first photocurrent in a row direction of the matrix, and a second signal line for transferring the first photocurrent in a column direction of the matrix, and
wherein the control line comprises a first control line for selecting a pixel in the row direction, and a second control line for selecting a pixel in the column direction, among the plurality of pixels.

10. The event-based sensor of claim 9, wherein, in response to the first control line being selected, the second signal line is blocked,
wherein, in response to the second control line being selected, the first signal line is blocked, and
wherein, in response to both the first control line and the second control line being selected, a photodiode of the first pixel and a pixel circuit of the first pixel are connected to each other.

11. The event-based sensor of claim 9, wherein, in response to the first control line not being selected, the second signal line is connected,
wherein, in response to the second control line not being selected, the first signal line is connected, and wherein, in response to at least one of the first control line and the second control line not being selected, a connection between a photodiode of the first pixel and a pixel circuit of the first pixel is blocked.

12. An event-based sensor comprising:
a plurality of pixels configured to generate respective photocurrents in response to input light; and
a controller configured to select one or more pixels to generate and supply a photocurrent to a given pixel, among the plurality of pixels, based on a noise level of the given pixel, so that the given pixel generates an activation signal based on the photocurrent.

13. The event-based sensor of claim 12, wherein the given pixel is configured to generate another photocurrent, and generate the activation signal based on a sum or an average of the photocurrent and the other photocurrent.

14. The event-based sensor of claim 13, wherein the controller is configured to select the one or more pixels such that the sum or the average of the photocurrent and the other photocurrent exceeds a predetermined threshold which is set based on the noise level.

15. The event-based sensor of claim 13, further comprising:
at least one dummy pixel disabled to sense input light and configured to generate a dark current; and
a current mirror configured to mirror the dark current so that the given pixel deducts a current component, corresponding to the dark current, from the other photocurrent generated in the given pixel.

16. The event-based sensor of claim 12, wherein the controller is configured to select the one or more pixels set to an inactive state and the given pixel set to an active state.

17. A pixel in an event-based sensor comprising:
a photodiode configured to generate a photocurrent based on incident light;
a pixel circuit configured to output an activation signal based on the photocurrent; and
a switching circuit configured to control connection between the photodiode and the pixel circuit depending on a control signal,
wherein the photocurrent is supplied to a pixel circuit of another pixel, depending on an operation of the switching circuit.

18. The pixel in an event-based sensor of claim 17, wherein the other pixel outputs another activation signal based on the photocurrent and another photocurrent generated in a photodiode of the other pixel.

19. The pixel in an event-based sensor of claim 17, wherein the pixel circuit is configured to covert the photocurrent to a voltage, and compare information about the voltage to a predetermined threshold to output the activation signal based on a result of the comparison.

* * * * *